United States Patent
Luther et al.

(10) Patent No.: US 7,302,152 B2
(45) Date of Patent: Nov. 27, 2007

(54) OVERMOLDED MULTI-PORT OPTICAL CONNECTION TERMINAL HAVING MEANS FOR ACCOMMODATING EXCESS FIBER LENGTH

(75) Inventors: James P. Luther, Hickory, NC (US); Robert B. Elkins, II, Hickory, NC (US); Lars K. Nielsen, Denver, NC (US)

(73) Assignee: Corning Cable Systems LLC, Hickory, NC (US)

( * ) Notice: Subject to any disclaimer, the term of this patent is extended or adjusted under 35 U.S.C. 154(b) by 348 days.

(21) Appl. No.: 11/027,340

(22) Filed: Dec. 30, 2004

(65) Prior Publication Data

US 2006/0147172 A1    Jul. 6, 2006

(51) Int. Cl.
*G02B 6/00* (2006.01)
*G02B 6/36* (2006.01)

(52) U.S. Cl. .................. 385/135; 385/134; 385/76; 385/77; 385/78; 385/100

(58) Field of Classification Search ........... 385/100, 385/76, 77, 78, 86, 139, 134, 135, 136, 137, 385/99, 53
See application file for complete search history.

(56) References Cited

U.S. PATENT DOCUMENTS

| | | | |
|---|---|---|---|
| 4,961,623 A | 10/1990 | Midkiff et al. | 350/96.2 |
| 5,004,315 A | 4/1991 | Miyazaki | 350/96.15 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,892,870 A | 4/1999 | Fingler et al. | 385/59 |
| 7,127,143 B2* | 10/2006 | Elkins et al. | 385/100 |

(Continued)

FOREIGN PATENT DOCUMENTS

DE        19940432 A1    8/1999

(Continued)

OTHER PUBLICATIONS

Tyco Electronics Raychem Product Sheet, FITS FOSC—Factory Installed Termination System for Fiber Optic Cable Splices, 1999, 2 pages.

*Primary Examiner*—Brian M. Healy
(74) *Attorney, Agent, or Firm*—Keith A. Roberson

(57) ABSTRACT

An overmolded multi-port optical connection terminal for a fiber optic distribution cable includes a tether cable containing a plurality of optical fibers optically connected to a corresponding plurality of optical fibers terminated from the fiber optic distribution cable at a first end of the tether cable, an overmolded housing a the second end of the tether cable, at least one connector port, and plenum means for accommodating excess fiber length (EFL) caused by shrinkage of the tether cable and/or pistoning of the optical fibers of the tether cable during connector mating. In one embodiment, a centralized plenum means is defined by an internal cavity within the overmolded housing sufficient for accommodating the EFL without micro bending. In another embodiment, a distributed plenum means is defined by an oversized tubular portion of the tether cable having an inner diameter sufficient for accommodating the EFL without micro bending.

20 Claims, 14 Drawing Sheets

U.S. PATENT DOCUMENTS

| | | | |
|---|---|---|---|
| 7,136,555 B2 * | 11/2006 | Theuerkorn et al. | 385/100 |
| 2006/0093303 A1 * | 5/2006 | Reagan et al. | 385/135 |
| 2006/0115220 A1 * | 6/2006 | Elkins et al. | 385/87 |
| 2006/0147172 A1 * | 7/2006 | Luther et al. | 385/135 |

FOREIGN PATENT DOCUMENTS

| | | |
|---|---|---|
| JP | 58-105114 | 6/1983 |
| JP | 60-169813 | 9/1985 |
| JP | 60-169815 | 9/1985 |
| JP | 60169813 | 9/1985 |
| JP | 61-27510 | 2/1986 |
| JP | 61-190305 | 8/1986 |
| JP | 61-220536 | 9/1986 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| WO | WO2005/036232 A2 | 9/2003 |
| WO | WO2005/036232 A3 | 9/2003 |

* cited by examiner

OVERMOLDED MULTI-PORT OPTICAL CONNECTION TERMINAL HAVING MEANS FOR ACCOMMODATING EXCESS FIBER LENGTH

BACKGROUND OF THE INVENTION

1. Field of the Invention

The present invention relates generally to an optical connection terminal for use in a fiber optic communications network, and more particularly, to an overmolded multi-port optical connection terminal including a tether cable, an overmolded housing, at least one connector port, and plenum means for accommodating excess fiber length (EFL).

2. Description of the Related Art

Optical fiber is increasingly being used for a variety of broadband communications including voice, video and data transmissions. As a result of the increase in demand for broadband communications, fiber optic networks typically include a large number of mid-span access locations at which one or more optical fibers are terminated or "branched" from a distribution cable. The mid-span access locations provide an interconnection point, also referred to herein as a "tap point," from the distribution cable leading to a network distribution terminal, or from the distribution cable leading directly to an end user, commonly referred to as a subscriber. Connectorized drop cables may be used to connect the subscriber with the network at the tap point, thereby extending an "all optical" communications network to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx."

In conventional fiber optic networks, drop cables are typically interconnected with a distribution cable at a mid-span access location within an aerial or buried splice closure. Substantial expertise and experience are required to enter the splice closure and initially install, reconfigure or repair the optical fiber connections within the closure. In particular, it is often difficult to access the splice closure and to identify the optical fibers of the distribution cable to be interconnected with a particular drop cable. Once identified, the optical fibers of the distribution cable are typically joined directly to the optical fibers of the drop cables at the mid-span access location using conventional fusion or mechanical splicing techniques. In other instances, the optical fibers of the distribution cable and the optical fibers of the drop cables are first spliced to a short length of optical fiber having an optical connector attached at the other end, referred to in the art as a "pigtail." The corresponding pigtails are then connected to opposite sides of an adapter to interconnect the drop cables with the distribution cable. In either case, the process of entering the splice closure is not only time consuming, but must be accomplished by a highly skilled field technician at a significant cost and under field working conditions that are usually less tan ideal. Reconfiguring a splice closure is especially difficult, particularly in applications where at least some of the optical fibers of the distribution cable extend uninterrupted through the closure. In such instances, the splice closure cannot be removed from the distribution cable to reconfigure the optical fiber connections. Further, once the connections are made, it is often difficult to subsequently re-route the connections or to add additional connections.

In order to reduce costs and allow less experienced field technicians to more easily perform field connections, optical connection terminals have been developed that include a length of tether cable having optical fibers on one end that are optically connected to optical fibers terminated from the distribution cable at a mid-span access location and a plurality of connector ports at the other end for receiving connectorized drop cables. These terminals typically include a rugged molded or metal housing defining a cable opening for receiving the tether cable and an internal cavity for separating and routing the optical fibers of the tether to their respective connector ports. Each connector port typically includes a receptacle for readily connecting an optical fiber of the connectorized drop cable to an optical fiber of the tether cable that is spliced to an optical fiber terminated from the distribution cable. The optical connection terminal may be attached to the mid-span access location in the factory or may be added to the mid-span access location in the field subsequent to deployment of the distribution cable. Optical connection terminals including a large number of connector ports, for example eight or twelve, are typically added after cable deployment due to their relatively large size, and thus, their inability to be pulled through small diameter ducts or over aerial installation pulleys.

Although existing optical connection terminals provide convenient access to the terminated optical fibers of the distribution cable, several disadvantages remain. For instance, it is expensive to provide optical connection terminals having a customized number of connector ports using molded or metal housings. Since it is not cost effective to produce optical connection terminals with only the exact number of connector ports needed, connector ports are often left unoccupied, resulting in additional materials costs and sealing requirements. In addition, molded plastic or metal housings defining an internal cavity are difficult to seal at the cable opening, the connector ports and along the mating lines of the parts due to cable shrinkage, cable movement and freeze/thaw cycling. One example of an optical connection terminal is described in U.S. Pat. No. 5,892,870 (the '870 patent) issued to Fingler et al. and entitled Fiber Optic Cable Connector. The '870 patent describes a hollow housing filled with an adhesive that encases the fibers of a multifiber optical cable within the housing to inhibit movement of the cable and the fibers within the housing. Although adequate sealing is achieved, the housing of the '870 patent does not accommodate for excess fiber length (EFL) caused by cable shrinkage or by pistoning that occurs when a connectorized drop cable is mated to a connector port.

Accordingly, there is a specific and unresolved need for an optical connection terminal adapted for interconnection with a distribution cable in a fiber optic communications network that overcomes the disadvantages described above. Specifically, an optical connection terminal is needed that provides convenient and ready access to the optical fibers terminated from the distribution cable, while accommodating for EFL caused by cable shrinkage and pistoning during connector mating in a sealed enclosure. What is also needed is a low cost, rugged optical connection terminal that can be easily customized to provide any number of connector ports and is capable of mitigating any difference between a pre-engineered span length measurement and the actual span length following deployment of the distribution cable that may arise as a result of a network measurement, cable assembly manufacturing or cable deployment error. What is also needed is a multi-port optical connection terminal that includes a tether cable adapted for interconnection to optical fibers terminated from a distribution cable at one end and for interconnection to a plurality of individual connector ports retained within an overmolded housing at the other end, while accommodating for EFL caused by shrinkage of the tether cable or pistoning when a connectorized drop cable is mated with one of the connector ports.

BRIEF SUMMARY OF THE INVENTION

To achieve the foregoing and other objects, and in accordance with the purposes of the invention as embodied and broadly described herein, the present invention provides various embodiments of an overmolded multi-port optical connection terminal for readily interconnecting one or more connectorized fiber optic drop cables with terminated optical fibers of a fiber optic distribution cable at a tap point in a fiber optic communications network. In various embodiments, the overmolded multi-port optical connection terminal may be used to connect one or more drop cables extending from a downstream location, such as a subscriber premises or a network connection terminal, to the tap point. In various embodiments, the overmolded multi-port optical connection terminal allows a field technician to readily connect or disconnect connectorized drop cables extending to subscriber premises or other remote locations at any time subsequent to installation at a convenient location within the network.

In various embodiments, the present invention provides an multi-port optical connection terminal including a tether cable having a first end adapted to be optically connected to optical fibers accessed and terminated from a fiber optic distribution cable at a mid-span access location, and a second end terminating in one or more connector ports disposed within a housing sealed by an overmolding process, wherein each connector port provides access to at least one optical fiber interconnected with at least one of the terminated optical fibers of the distribution cable. In preferred embodiments, each connector port comprises an optical connector that is connected to the backside of a rugged receptacle suitable for use in an outdoor environment. Each connector port is configured with a receptacle operable for receiving the individual connectors from the inside of the multi-port terminal and connectorized drop cables from the outside of the multi-port terminal. The optical connector of the connector port and the optical connector of a connectorized drop cable may be received within an adapter or connector alignment sleeve operable for aligning the optical fibers of the respective connectors. In particular embodiments, the multi-port terminal includes a tether cable having a preselected length that permits a field technician to readily connect a connectorized drop cable to the network at a convenient location in a fiber optic communications network.

In another exemplary embodiment, the present invention provides a factory-prepared multi-port optical connection terminal including a tether cable, an overmolded housing defining a flexible boot overmolded around a portion of the tether cable, and one or more connector ports for receiving a connectorized drop cable. In various embodiments, the overmolded housing defines a furcation and plenum for routing the optical fibers to their respective connector ports and accommodating for excess fiber length (EFL) caused by shrinkage of the tether cable and by pistoning that occurs during connector mating. In further embodiments, the present invention provides a fiber optic distribution cable assembly having at least one, and preferably a plurality of, predetermined mid-span access locations that serve as "tether attach points," and a corresponding plurality of multi-port optical connection terminals that are attached to the respective mid-span access locations. The multi-port terminals are strapped or lashed to the distribution cable during shipping and deployment. When needed following deployment, the multi-port terminals may be positioned at the desired tap point within the fiber optic communications network by moving the multi-port terminal along the length of the distribution cable or positioning the terminal away from the distribution cable to thereby mitigate any span length difference and provide a tap point at a desired location within the fiber optic communications network. In an alternative embodiment, the multi-port terminal may be spliced or otherwise optically connected in the field to a previously installed fiber optic distribution cable at a mid-span access location.

In yet another exemplary embodiment, the present invention provides a method of forming an overmolded optical connection terminal having a plurality of connector ports extending through an external wall of a housing. The method includes providing a molding tool, positioning the plurality of connector ports and a portion of a tether cable within the molding tool, routing optical fibers of the tether cable terminating in optical connectors to respective connector ports, providing a plenum for permitting movement of the optical fibers to accommodate for EFL, and injecting or pouring an overmolding material into the molding tool to form the housing of the optical connection terminal. The present invention further provides various tools for forming overmolded multi-port optical connection terminals. In yet another embodiment, the present invention provides a method for mitigating a span length difference in a pre-engineered fiber optic communications network comprising a fiber optic distribution cable assembly having at least one predetermined mid-span access location. The method comprises optically connecting one or more accessed and terminated optical fibers of the distribution cable to corresponding optical fibers of a tether cable attached to the distribution cable at the mid-span access location. The method further comprises providing an overmolded multi-port optical connection terminal at a downstream end of the tether cable and positioning the terminal at a desired location in the fiber optic communications network to compensate for the span length difference.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
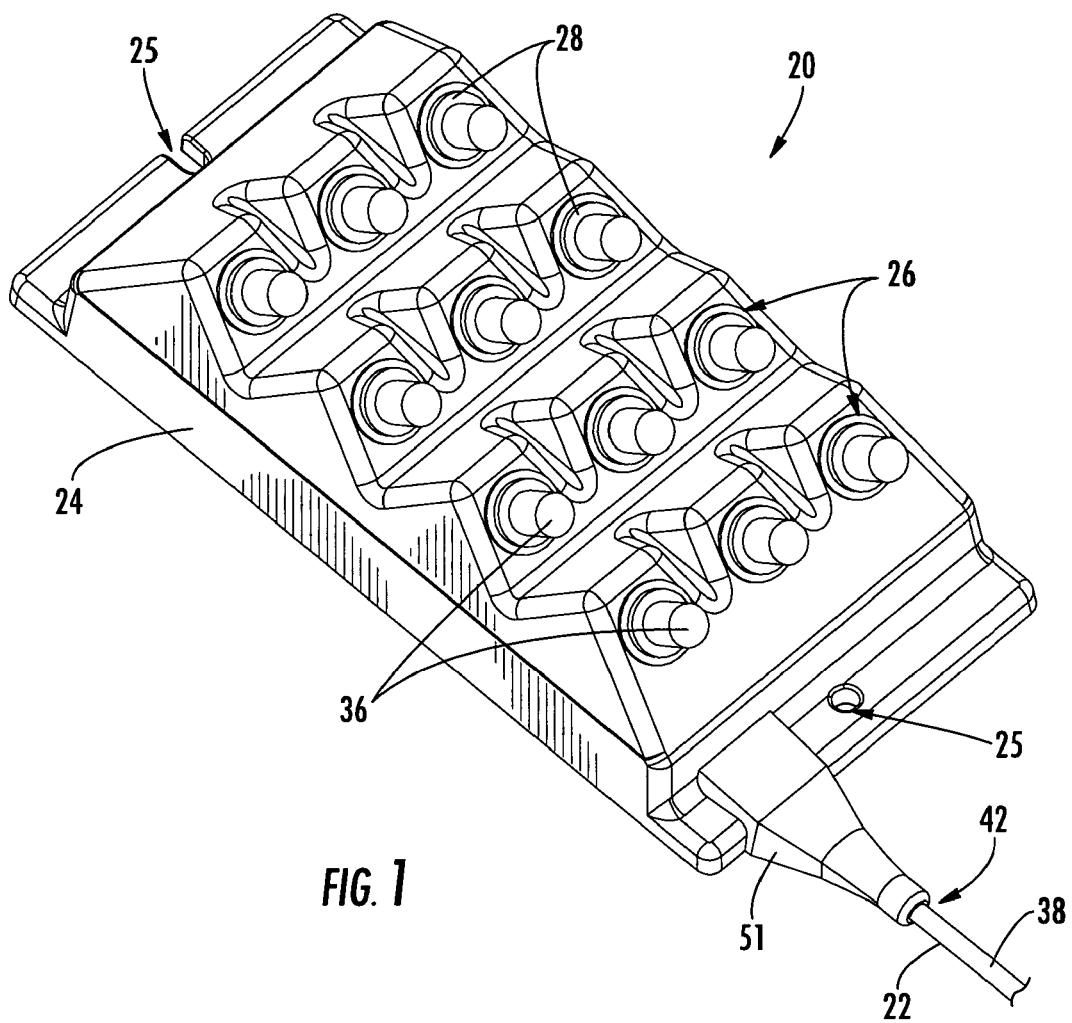
FIG. 1 is a perspective view of an overmolded optical connection terminal including a plurality of connector ports arranged in rows and a tether cable in accordance with an exemplary embodiment of the present invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The present invention provides various embodiments of an overmolded multi-port optical connection terminal, also referred to herein as a "multi-port terminal," "overmolded terminal" or "terminal," for a fiber optic communications network comprising a tether cable having a first end adapted to be attached to a fiber optic distribution cable and a second end terminating in an overmolded housing including one or more connector ports secured within an exterior wall of the terminal. Each connector port provides access to at least one optical fiber interconnected with at least one optical fiber terminated from the distribution cable. The term "overmolded" is intended to encompass any known molding procedure, such as injection molding and pour molding and refers to the method of pouring or injecting a molding material in a semi-viscous or liquid state into a molding tool in which connector ports, receptacles, optical connectors, optical fibers, a furcation, a plenum, a tether cable, etc. are positioned. The molding material fills in air spaces within the molding tool around the components positioned therein, and when allowed to cure, forms a rugged yet flexible protective housing with improved sealing performance as compared to conventional hollow plastic or metal housings defining an internal cavity.

Utilizing the tether, the multi-port terminal may be used to mitigate span length differences that result from the improper positioning of a mid-span access location due to a span length measurement, cable manufacturing or cable deployment error in a pre-engineered fiber optic communications network following deployment of the distribution cable. The multi-port terminal provides an interconnection point, also referred to herein as a "tap point," at a desired location along the length of the distribution cable or at another location away from a distribution cable, such as a telephone pole, vault, hand-hole, cabinet or network connection terminal (e.g., aerial closure, buried closure, pedestal, etc.). In all of the embodiments described herein, the multi-port terminal is attached to a fiber optic distribution cable at a mid-span access location along the length of the distribution cable and provides a preselected or customized length of tether cable that is used to correct the position of the mid-span access location or to extend the reach of the distribution cable and thereby position a tap point at a desired location in the fiber optic communications network to interconnect an optical fiber of the distribution cable with an optical fiber of a connectorized fiber optic cable, such as a branch cable or drop cable, referred to generically herein as a "drop cable."

In the exemplary embodiments shown and described herein, optical fibers accessed and terminated from a mid-span access location of the distribution cable are spliced or otherwise optically connected to optical fibers of the tether cable of the terminal. The tether cable has a preselected or customized length greater than about 12 feet. The remaining optical fibers of the distribution cable are managed and routed separately from the accessed and terminated optical fibers such that they extend uninterrupted through the distribution cable and are available for accessing and terminating at downstream mid-span access locations. In preferred embodiments, the distribution cable comprises a plurality of mid-span access locations at predetermined spaced-apart locations along the cable length, thus providing multiple access locations that serve as "tether attach points" for attaching the tether cables of the terminals to the distribution cable.

The distribution cable and the tether cable may present their respective optical fibers for interconnection with each other and with other optical fibers in the fiber optic communications network in various configurations, including but not limited to, splice-ready optical fibers, connectorized optical fibers and pre-connectorized optical fibers positioned within a receptacle comprising alignment means, such as an adapter or connector alignment sleeve, or a plug. In one embodiment, one or more connectorized drop cables are routed to the receptacle of a connector port provided on the multi-port terminal subsequent to the initial deployment of the distribution cable and the positioning of the terminal within the network. The receptacle may be configured with a variety of connector types, such as but not limited to SC, LC, DC, FC, ST, SC/DC, MT-RJ, MTP, MPO and other like single or multi-fiber ferrules now known or hereafter developed.

In all of the embodiments shown and described herein, various types of distribution cables may be accommodated, such as monotube, loose tube, central tube, ribbon and the like. One example of a type of distribution cable suitable for use in conjunction with the present invention is an ALTOS® dielectric cable available from Corning Cable Systems LLC of Hickory, N.C. The ALTOS® dielectric cable is a lightweight fiber optic cable designed for both buried (conduit) and aerial (lashed) deployments. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. In preferred embodiments, the distribution cable is flexible, easy to route and has no preferential bend, except perhaps within a mid-span access location to protect the optical fibers terminated from the distribution cable from excessive axial tension stresses induced by bending. In all embodiments shown and described herein, various types of tether cables may also be accommodated, such as monotube, loose tube, central tube and ribbon, and the tether cable may be disposed within another tubular body in a cable assembly.

Referring to FIG. 1, an overmolded multi-port optical connection terminal 20 including a preselected or customized length of a tether cable 22 adapted to be attached to a distribution cable (not shown) at a mid-span access location is shown. In this exemplary embodiment, the tether cable 22 contains a plurality of optical fibers and is routed into the terminal housing 24 where the optical fibers of the tether cable 22 are separated into a plurality of individual optical fibers that are routed to their respective connector ports 26. The terminal housing 24 may have any shape and may accommodate any number of connector ports 26 arranged in any manner. Preferably, however, the connector ports are arranged in a pattern of M rows by N connector ports (i.e., M×N) where M and N are equal to or greater than one, including one or more individual connector ports (i.e., 1×1) mounted upon the ends of one or more optical fibers contained within a tubular body sometimes referred to as a "uni-port." The housing 24 may also define slots or openings 25 for receiving fasteners for securing the terminal 20 in a desired location, such as on a telephone pole, on a structure, or within a vault, cabinet, pedestal, etc. In the specific embodiment shown, the connector ports 26 are arranged in four rows of three (i.e., 4×3), thus providing a total of twelve connector ports through an exterior wall on an outer surface of the housing 24. In alternative embodiments, connector ports 26 may be located on more than one outer surface of the housing 24 and may be arranged in any number (M) of rows including any number (N) of connector ports 26 to thereby provide an M×N multi-port optical connection terminal.

Each connector port 26 provides access to at least one optical fiber of the tether cable 22 that is interconnected with at least one optical fiber terminated from the distribution cable at the mid-span access location. As shown, each connector port 26 is occupied with a receptacle 28 for receiving an optical connector mounted upon the end of an optical fiber routed to the back side of the receptacle 28 from inside the terminal 20. A suitable receptacle 28 is the OptiTap™ fiber optic receptacle available from Corning Cable Systems LLC of Hickory, N.C. Each receptacle 28 is also adapted to receive a plug (not shown) of a connectorized fiber optic cable, such as a branch cable or a drop cable, referred to generically hereinafter as a drop cable, routed to the front side of the receptacle 28 from outside the terminal 20. The connector ports 26, and in particular the receptacles 28, may be used to readily interconnect an optical fiber of the connectorized fiber optic drop cable with a terminated optical fiber of the distribution cable at a desired location in a fiber optic communications network. As used herein, the term "connector port" is intended to broadly include any component provided at the terminal end of the tether cable 22 that facilitates optical connection of an optical fiber of the tether cable 22 to an optical fiber of the connectorized drop cable, including but not limited to a receptacle 28, a plug 30 (e.g., FIG. 14) and a fiber optic connector 32 (e.g., FIG. 4). However, the connector port 26 may also comprise a factory-installed adapter or connector alignment sleeve positioned within the receptacle 28, or a field-installed adapter or connector alignment sleeve for aligning and maintaining mating optical connectors in opposing physical contact. In various embodiments, the connector port 26 further provides an environmental seal for protecting the optical connection between the optical fiber of the tether cable 22 and the optical fiber of a drop cable 34 (e.g., FIG. 14). The connector port 26 may also serve to strain relieve the optical fibers of the tether cable 22 and/or the drop cable 34 by transferring any tension load applied to the tether cable 22 and/or the drop cable 34 to the structure (e.g., receptacle 28) of the connector port 26 in a known manner. Furthermore, any tension or compression forces applied to the receptacle 28 are preferably transferred to the housing 24 of the overmolded multi-port optical connection terminal 20.

The overmolded terminal 20 is shown with each connector port 26, and more particularly, with each receptacle 28 covered by a protective dust cap 36 during transport and deployment, and until the connector port 26 is needed. The protective dust cap 36 prevents water and other contaminants, such as dust, dirt and insect infestation, from entering the connector port 26 and damaging the optical fiber(s) and/or fiber optic connector(s) disposed therein. As shown, the protective dust caps 36 define a gripping surface for removing the dust cap from its respective port. In alternative embodiments, the dust caps 36 may be configured with a low-profile and means for removing the dust cap 36, thereby reducing the profile of the terminal 20. This is an important feature when constructing terminals having a lesser number of connector ports 26 that may be pulled through relatively small-diameter conduits or over aerial installation pulleys. Low-profile dust caps 36 may have a slot molded into their surface for removal with a tool, such as a screwdriver or a coin. The dust caps 36 may be threaded or snapped into place and secured to the receptacle 28. Although not shown, the dust cap 36 may be attached to a corresponding receptacle 28 by a lanyard, such as a conventional braided wire (not shown), to prevent the dust cap 36 from becoming separated from the receptacle 28 following removal.

The tether cable 22 may be any fiber optic cable having a preselected or customized length and containing one or more optical fibers. Preferably, the tether cable 22 has the ability to mitigate excess fiber length (EFL) due to shrinking of the cable from environmental changes by permitting macro-bending (S-bending) of the optical fibers within the tether cable 22. This may be accomplished in several ways, for example intrinsic fiber properties, such as mode-field-diameter modifications that improve loss performance, and a relatively large internal cable volume in combination with relatively small diameter optical fibers, such as 500 µm tight-buffered fibers. As shown, the tether cable 22 comprises a tubular jacket or sheath 38 adapted to be attached to the distribution cable at a mid-span access location and configured to route and protect the optical fibers between the distribution cable and the terminal housing 24. In optical connection terminals in which interior space is limited, the tether cable 22 may include a large inner diameter tubular element to allow for S-bending of the optical fibers within the tether cable 22. As a result, the large inner diameter tubular element of the tether cable 22 functions as a means for accommodating EFL, and is referred to herein as a distributed plenum. The end of the tether cable 22 opposite the terminal housing 24 is preferably secured to the distribution cable at the mid-span access location by overmolding around a portion of the tether cable sheath 38 after the optical fibers of the tether cable 22 have been spliced to the optical fibers terminated from the distribution cable at the mid-span access location. The end of the tether cable 22 adjacent the terminal housing 24 is secured to the terminal housing 24 by overmolding around the sheath, or by securing a portion of the tether cable 22 within a centralized plenum, as will be described, positioned within the terminal housing 24.

At the end of the tether cable 22 and inside the overmolded terminal housing 24, a furcation 40 (shown in FIG. 9) may be used to separate the individual optical fibers 46 of the tether cable 22. In different embodiments, the furcation 40 also functions to transfer the fiber pistoning from the terminal housing 24 into the tether cable 22 or vice-versa. The furcation 40 comprises a furcation plug that is secured by the overmolding material near the entry point 42 of the tether cable 22 into the housing 24. At least one, and preferably a plurality, of optical fibers 46 are secured within the body of the furcation 40 by an epoxy material in a known manner to form a conventional furcation plug. In an alternative embodiment, the tether cable 22 may be secured by the overmolding material and the individual optical fibers 46 routed to their respective connector ports 26 without first going through a furcation body. However, with a furcation 40, the optical fibers 46 may be routed, commonly referred to as "up-jacketed," into a loose jacket, sheath or cable containing one or more optical fibers 46 of the tether cable 22. The individual optical fibers 46 within the terminal housing 24 may have the same length or may have varying lengths so as to stagger the connector ports 26 along the length (or width) of the terminal 20. In this manner, a distribution cable assembly having a "low profile" with a linear array of connector ports 26 (i.e., M×1) may be deployed through a conduit having a relatively small inner diameter or significant bends, or over conventional aerial lashing equipment.

Figure 2:
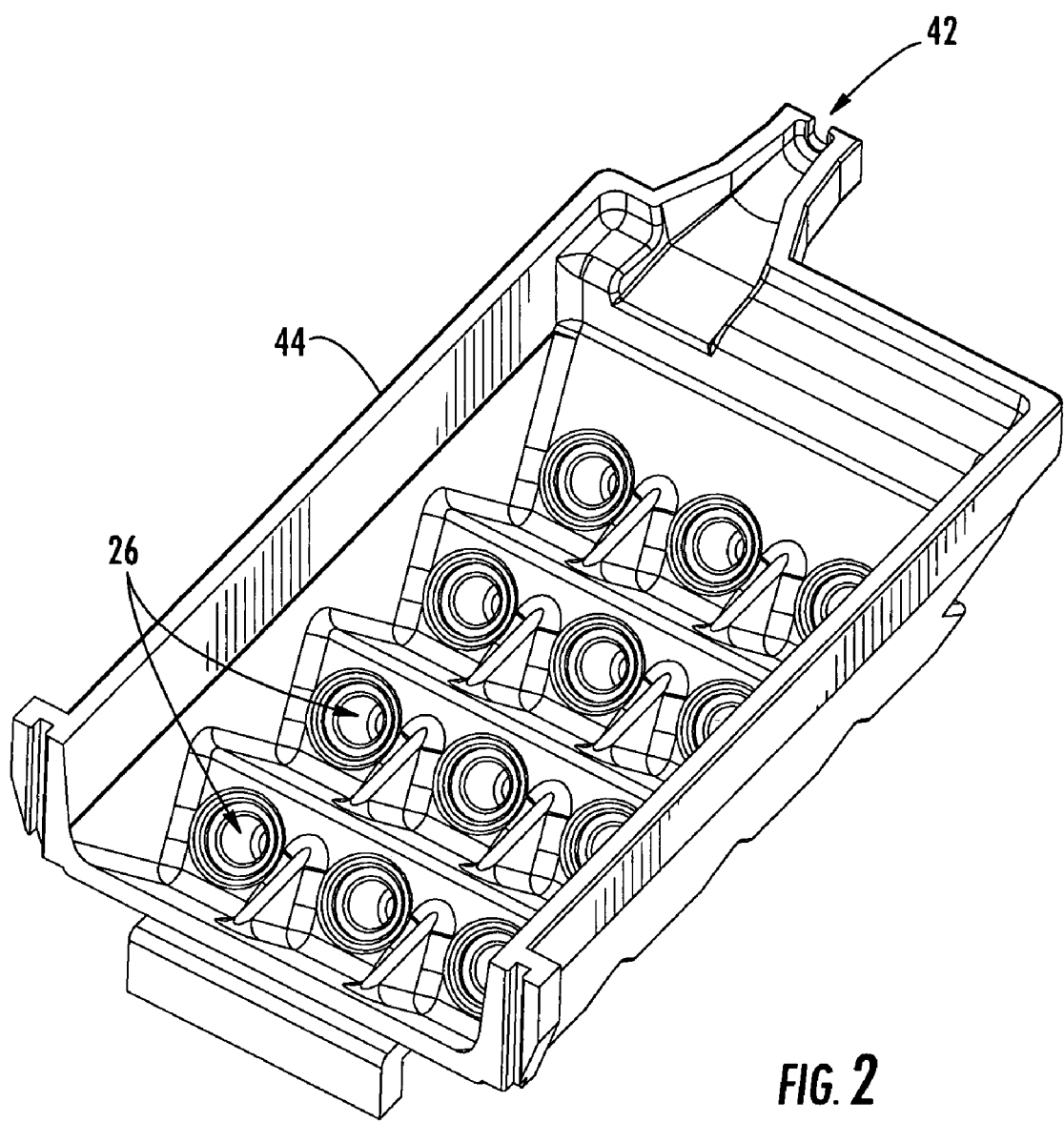
FIG. 2 is a perspective view of a molding tool for overmolding the optical connection terminal of FIG. 1 including a cable entry opening and a plurality of cavities for positioning the connector ports prior to molding.
Figure 3:
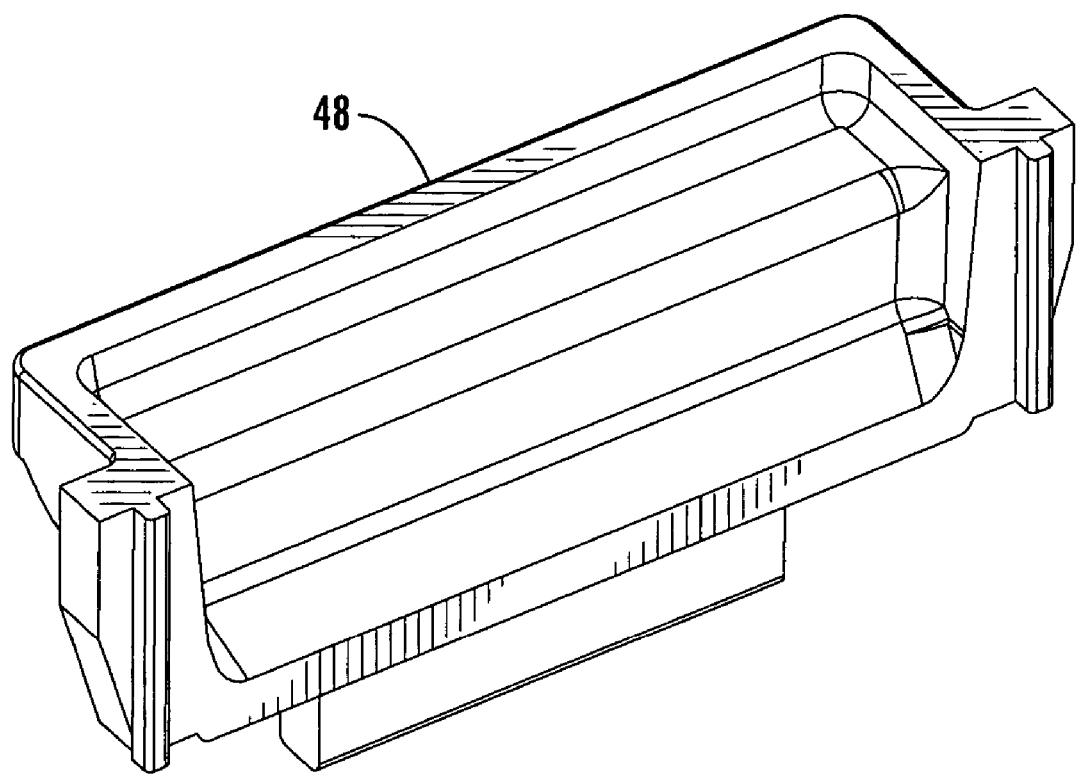
FIG. 3 is a perspective view of an end-piece for cooperating with the molding tool shown in FIG. 2.
Figure 4:
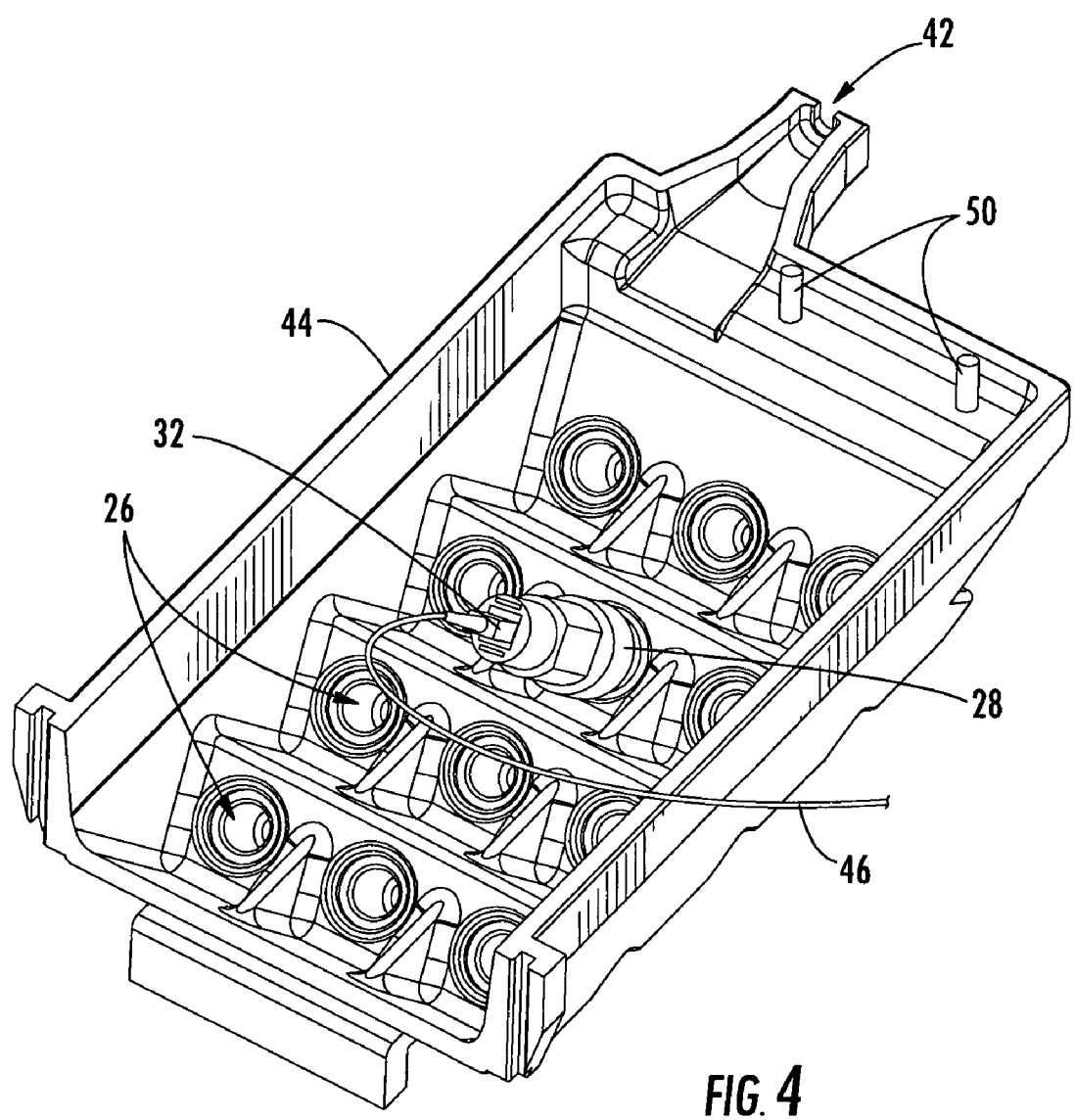
FIG. 4 is a perspective view of the molding tool of FIG. 2 shown prior to overmolding with pins for molding openings in the optical connection terminal and a typical connector port positioned within one of the plurality of cavities.

Referring now to FIGS. 2-4, a tool 44 for overmolding the optical connection terminal 20 of FIG. 1 is shown. The tool 44 defines one or more recesses for receiving connector ports 26 and an opening 42 for receiving an end portion of the tether cable 22. Receptacles 28 are positioned within the respective connector port 26 recesses and one or more optical fibers 46 of the tether cable 22 terminated with connectors 32 are routed to the respective receptacle 28. Preferably, an open air space, referred to herein as a plenum, is formed in the terminal housing 24 by the tool to permit movement of the optical fibers 46 for accommodating EFL caused by shrinkage and fiber pistoning during drop cable connection, as will be described in more detail below. The connector ports 26 recesses of the tool 44 allow a portion of the front side of the receptacles 28 to pass through the tool 44, thereby exposing the connector ports 26 outside the terminal housing 24. Thus, the receptacles 28 seal the connector ports 26 recesses during overmolding and the front side of the receptacles 28 are not exposed to the overmolding material. Prior to overmolding, a preselected number of receptacles 28 are positioned within the tool 44, the optical fibers 46 are routed to the receptacles 28, the plenum is formed, the tether cable 22 is positioned within opening 42 and a furcation (if present) is positioned within the tool 44. Alternatively and referring specifically to FIG. 3, the tool 44 may include an end cap 48 that is attached to close the open end of the tool 44 prior to overmolding. Various end caps 48 may define different molded configurations for the housing 24, such as attachment features. Pins 50 may also be positioned within the tool 44 to provide openings 25 in the housing 24 for receiving fasteners to secure the terminal 20, as previously described.

Once all components have been positioned, the overmolding material is poured or injected into the tool 44 so that the overmolding material surrounds and encapsulates the components. Once allowed to cure, the overmolding material forms a rugged and sealed (i.e., moisture impervious) terminal housing 24 suitable for use in an outdoor environment. The overmolding process is also be used to secure the tether cable 22 within the housing 24. The overmolding process also involves preparing the sheath 38 of the tether cable 22 in a manner well known in the art, such as by cleaning and roughening, flame preparing or chemically preparing the surface to promote friction and adhesion with the overmolding material. The overmolding process and tool 44 result in a smooth transition boot 51 (FIG. 1) being formed between the housing 24 and the tether cable 22. Suitable examples of overmolding materials include, but are not limited to, polyurethanes, silicones, thermoplastics, and like rugged, yet flexible materials. The overmolding materials are poured or injected into the internal cavity defined by the overmolding tool 44. The overmolding material provides a protective shell, maintains sealing integrity and is preferably capable of withstanding crush forces up to at least about 300 lbs. In an alternative embodiment, a thin film of material may be molded onto the exterior of the dust caps 36 and an exterior portion of the receptacles 28, thus providing a first-use tamper evident seal. The tool 44 may be modified to overmold the dust caps 36, or alternatively, the dust caps 36 may be covered with the same molding material after the terminal housing 24 has cured and been removed from the molding tool 44.

Figure 9:
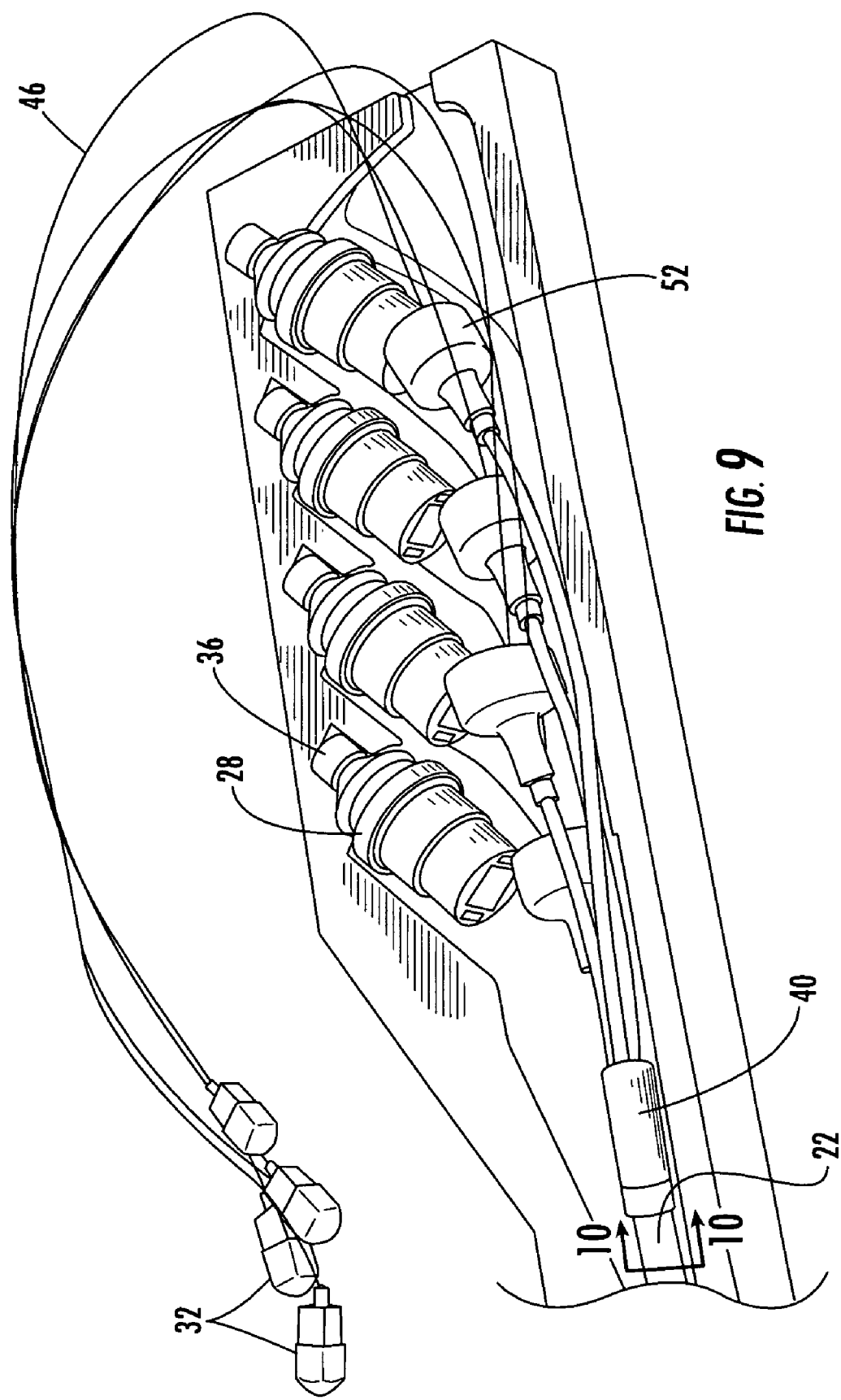
FIG. 9 is a perspective view of the molding tool of FIG. 8 shown prior to overmolding with a plurality of optical connectors of the tether cable disconnected from their respective connector ports.

Space permitting, a plenum may be provided within the terminal housing 24 to mitigate EFL caused by pistoning effects due to connector mating. The plenum allows the optical fibers 46 to move freely within the multi-port terminal 20 and/or the tether cable 22. Depending on the overmolding material and the structural rigidity requirements, the plenum may be sized to leave only a shell of the overmolded material. As stated above, a tether cable 22 having an oversized inner diameter tubular portion may serve as the plenum when there is limited space inside the terminal housing 24. The oversized portion of the tether cable 22 is capable of accommodating all EFL generated by cable shrinkage or connector mating without incurring micro bending of the optical fibers 46. The exact amount of EFL needed is dependent upon the fiber type and the buffer scheme. Piece-piping systems including molded plastic parts, such as straight pipes, Y-branching pipes, curved pipes and a plug or end that are all C-split with an overlapping flap may also be provided to customize the plenum construction for any number of connector ports 26. Other molding apparatus such as SLA epoxy, metal or plastic molds machined or molded may also be used. The various plenums are positioned within the overmolding tool 44 prior to adding the overmolding material. In all plenum embodiments, sufficient space must be available within the plenum to allow for substantially all of the fiber movement caused by cable shrinkage and pistoning of the optical fibers 46 that results when a plug 30 of a drop cable 34 is connected to the front side of a receptacle 28 in a connector port 26. More specifically, as the ferrules of the opposing connectors come into physical contact, the optical fiber 46 of the tether cable 22 is forced backwardly into the terminal housing 24, referred to herein as "pistoning." The backward movement of the optical fiber 46 must be taken up within the terminal housing 24 or within the tether cable 22. Otherwise, the optical fiber 46 may be damaged, or micro-bending may occur leading to attenuation. In one example of a plenum, a flexible molded boot may be added to the back side of the receptacle 28 to provide an air space for fiber movement. An example of such a flexible boot is shown in FIG. 9 at reference numeral 52. In another example, a plenum may be provided adjacent the upstream end of the terminal housing 24 adjacent the cable opening 42 using fiber routing structure defining a cavity that creates an air space. In a further example, an air space may be provided in a medial portion of the housing 24 using a two-step overmolding process in which the overmolding tool 44 is first filled just above the receptacles 28, a generally hollow structure defining a cavity is introduced onto the molding material to provide an air space, and then the overmolding material is again injected or poured into the tool 44 to encapsulate the structure. As one of ordinary skill in the art will readily appreciate, various other plenums are possible and may be used alone or in combination with the embodiments shown and described herein as long as sufficient air space is provided to accommodate for the required amount of EFL. Additional air space for permitting fiber movement may also be provided in the length of the tether cable 22.

Figure 5:
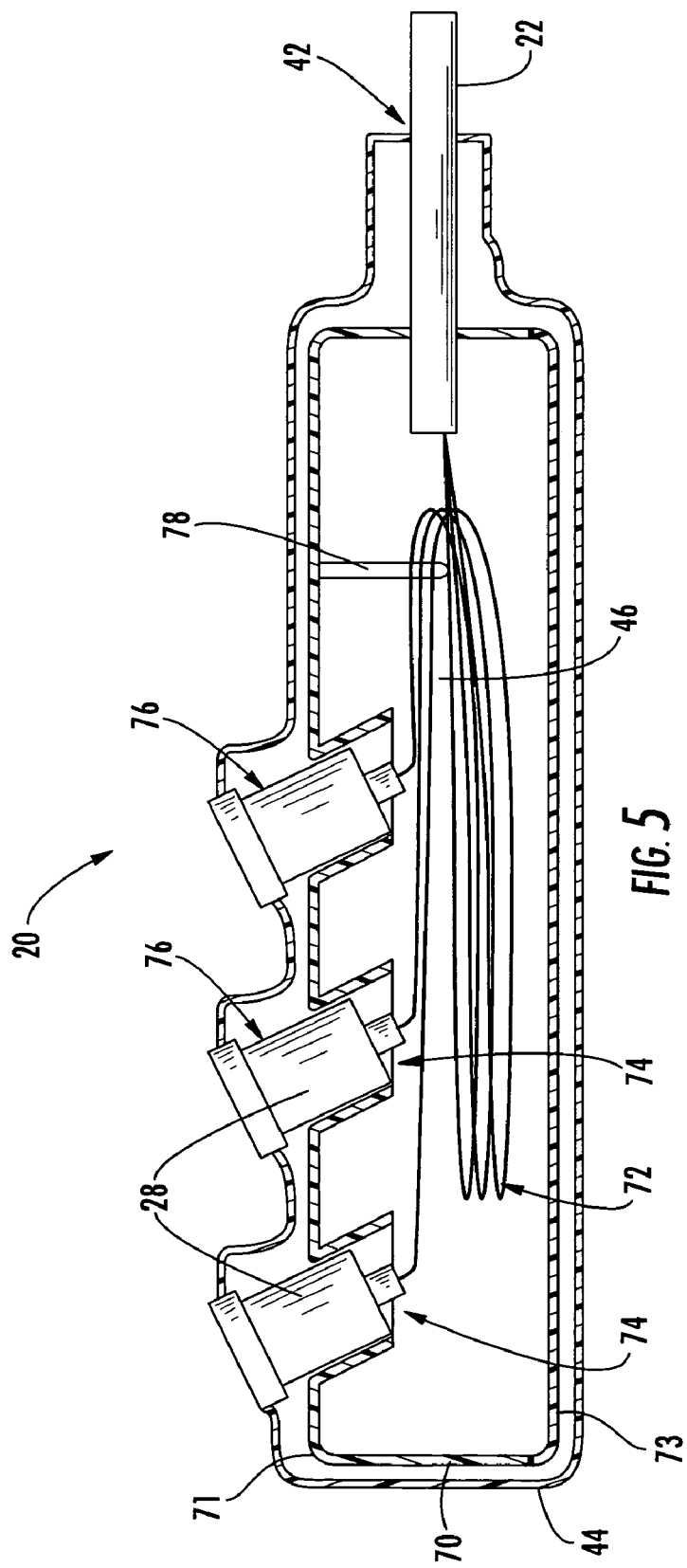
FIG. 5 is a cross-sectional view of a molding tool for overmolding an optical connection terminal illustrating a centralized plenum for accommodating excess fiber length (EFL) in the optical connection terminal caused by cable shrinkage or pistoning during connector mating.

Referring to FIG. 5, a cross-sectional view of an exemplary molding tool comprising three rows of connector ports comprising receptacles 28 shows a specific embodiment of a centralized plenum in accordance with the invention. In particular, a generally boxed-shaped plenum 70 having a base portion 71 and a lid portion 73 is positioned within the molding tool 44 such that it defines an internal cavity 72 within the multi-port terminal 20 that does not receive overmolding material. The plenum 70 defines plenum ports 74 for receiving a portion of the back side of the receptacles 28. Overmolding material is received over a portion of the receptacles 28 located between the inner surface of the tool 44 and the base portion 71 of the plenum 70, indicated by reference numeral 76. The optical fibers 46 are routed and coiled within the internal cavity 72 defined by the plenum 70 from the respective receptacles 28 to the cable opening 42, where they are received within a furcation (not shown) or are routed directly into the tether cable 22. The optical fibers 46 may also be routed through a cable guide 78. The plenum 70 may further define an opening for receiving the tether cable 22 while providing a seal for preventing the overmolding material from entering the internal cavity 72. The internal cavity 72 creates an air space that is large enough to be used with larger M×N terminals 20 and sufficient to accommodate the EFL required to mitigate any amount of fiber movement caused by shrinkage of the tether cable 22 and/or pistoning of the optical fibers 46 due to connector mating.

Figure 6:
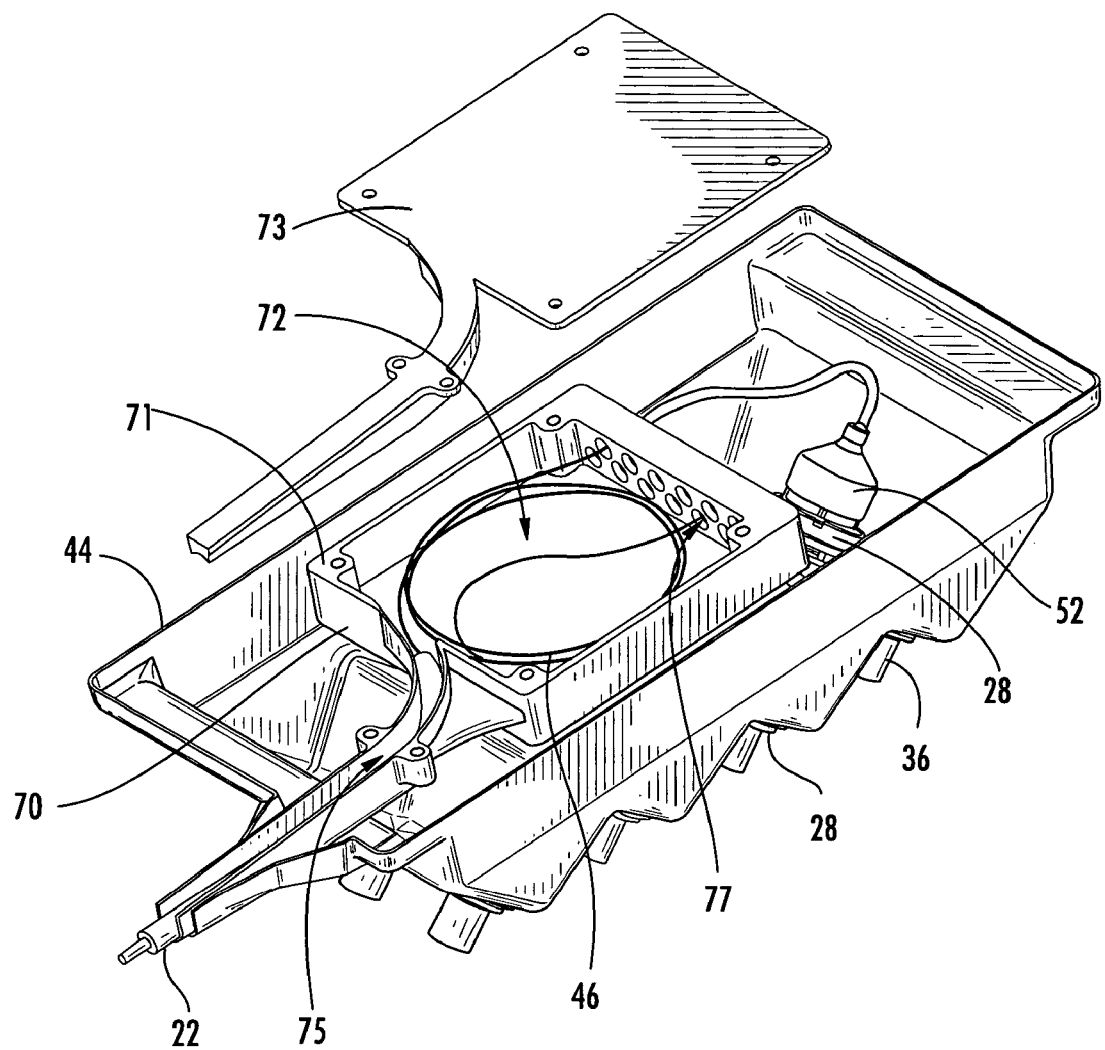
FIG. 6 is a perspective view of an exemplary embodiment of an internal plenum defining a centralized plenum positioned within an overmolded optical connection terminal in accordance with another exemplary embodiment of the present invention.

Referring to FIG. 6, a perspective view of the overmolding tool 44 of FIG. 4 illustrates another embodiment of a centralized plenum in accordance with the invention. As described generically above, a boxed-shaped plenum 70 having a base portion 71 and a lid portion 73 is positioned within the tool 44 such that it defines an internal cavity 72 within the multi-port terminal 20 that does not receive overmolding material. The plenum 70 defines a tether cable receiving portion 75 and a plurality of openings 77 through which the optical fibers 46 are routed out of the plenum 70 to their respective receptacles 28. In one exemplary embodiment, the optical fibers 46 exit the tether cable 22 as 250 µm tight-buffered jacketed fibers and exit the plenum 70 as 250 µm, 500 µm or 900 µm jacketed fibers. Flexible boots 52, as previously described, are provided to seal the interface between the optical connector 32 ad the receptacle 28 and to accommodate a portion of the EFL caused by insertion of the plug 30 of the drop cable 34 into the receptacle 28. The tether cable 22 is secured within the plenum 70 and the optical fibers 46 are routed and coiled within the internal cavity 72 defined by the plenum 70 prior to installing the lid portion 73 and overmolding the terminal. The internal cavity 72 creates an air space that is large enough to be used with larger M×N terminals 20 and sufficient to accommodate the EFL required to mitigate any amount of fiber movement caused by shrinkage of the tether cable 22 and/or pistoning of the optical fibers 46 due to connector mating.

Figure 7:
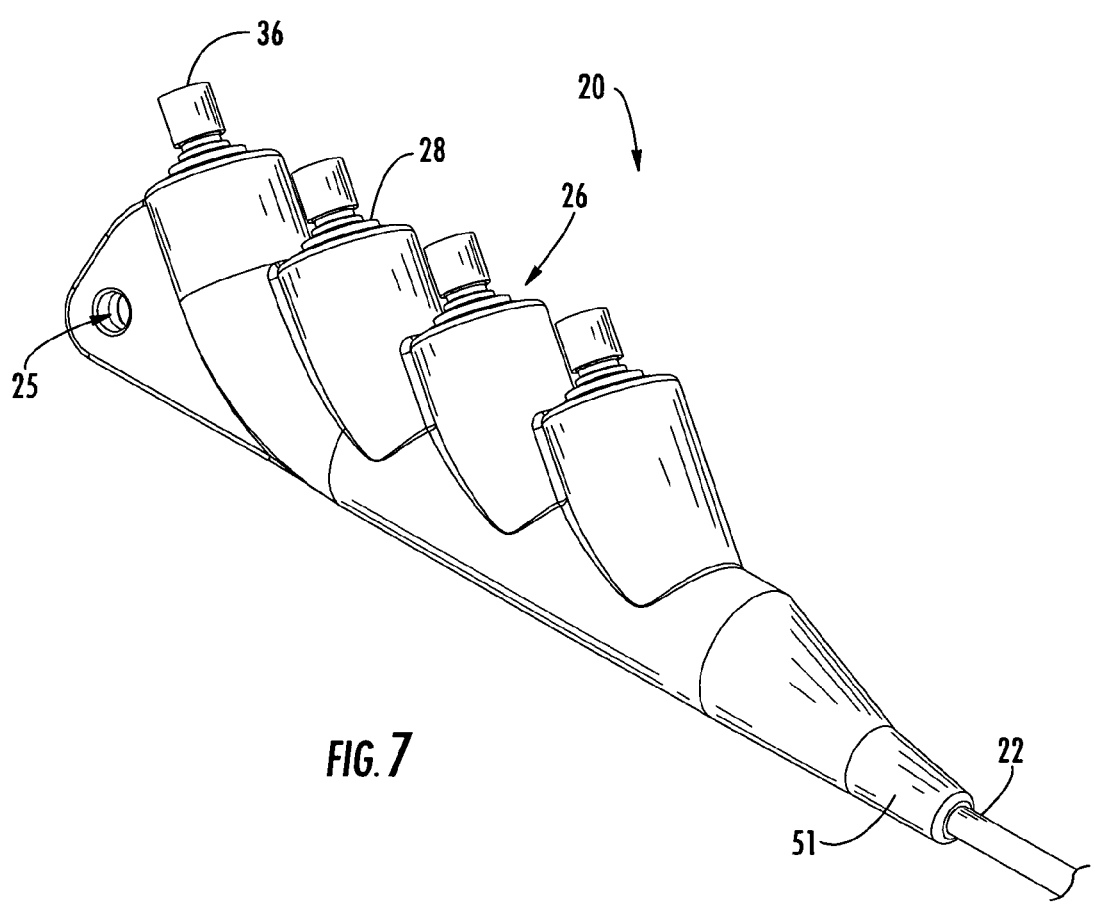
FIG. 7 is a perspective view of an overmolded multi-port optical connection terminal including a plurality of connector ports arranged linearly and a tether cable in accordance with another exemplary embodiment of the present invention.

Referring to FIG. 7, another embodiment of an overmolded multi-port optical connection terminal 20 including a preselected or customized length of tether cable 22 adapted to be attached to a distribution cable (not shown) at a mid-span access location is shown. In this embodiment, four connector ports 26 are arranged linearly (i.e., 4×1) in order to provide a low-profile distribution cable and tether assembly suitable for deployment through a relatively small diameter conduit or over an aerial installation pulley. Low-profile terminals 20, such as shown in FIG. 7, may be attached to the mid-span access location in the factory and wound onto a cable reel for transport and deployment. The connector ports 26 are staggered and each includes a receptacle 28 covered with a protective dust cap 36. As in the previous embodiment, low-profile dust caps 36 may be used instead of the protruding dust caps 36 shown. Each receptacle 28 may include an alignment member for aligning and mating opposing optical connectors. The linear multi-port terminal 20 may be secured to the distribution cable during deployment and following installation using cable ties, lashings or more secure fasteners, such as clamps capable of withstanding pulling forces up to about 100 pounds in either pulling direction. The clamps may be secured to both ends of the multi-port terminal 20 and may also be placed at various intervals along the length of the tether cable 22. It should be understood that mechanical clamps may be used to secure any of the multi-port terminals 20 described herein to the distribution cable during deployment and following installation.

Figure 8:
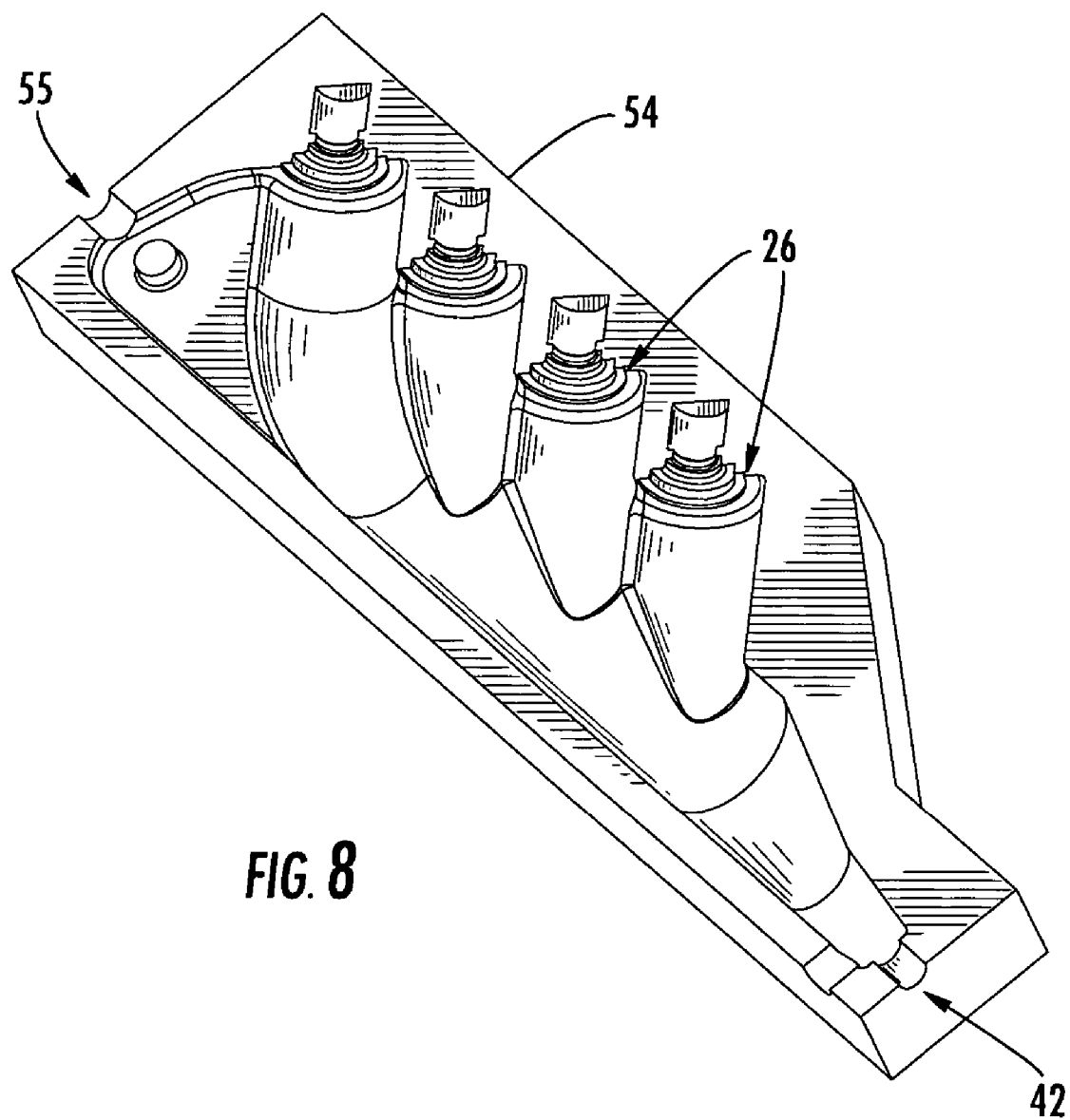
FIG. 8 is a perspective view of one half of a clamshell molding tool for overmolding the multi-port optical connection terminal of FIG. 7.

Referring to FIGS. 8 and 9, a first portion an overmolding tool 54 suitable for overmolding the multi-port terminal 20 of FIG. 7 is shown. A second portion of the tool 54 having a mirror image of the first portion is secured to the first portion to form an internal cavity for receiving the components and the overmolding material. The tool 54 defines one or more recesses for connector ports 26, an opening 42 for receiving a portion of the tether cable 22, and an injection port 55 for receiving the overmolding material. Receptacles 28 are positioned within their respective connector port 26 recesses and one or more optical fibers 46 of the tether cable 22 terminating in optical connectors 32 are routed to their respective receptacle 28. Referring to FIG. 9, the connectors 32 and the flexible boots 52 are shown prior to insertion into their respective receptacles 28. Prior to injecting the overmolding material, the connectors 32 and flexible boots 52 are connected to the receptacles 28 and the optical fibers 46 are fed (i.e., pushed or pulled) into the oversized inner diameter tubular tether cable 22. A distributed plenum for accommodating the necessary amount of EFL resulting from cable shrinkage and pistoning during connector mating is provided by the tubular tether cable 22, as previously described. The flexible boots 52 accommodate a portion of the EFL and further prevent overmolding material from entering the back side of the receptacle that might bias an alignment sleeve located within the receptacle 28 or prevent the alignment sleeve, springs or other components of the receptacle 28 from functioning properly. Prior to overmolding, a preselected number of receptacles 28 are positioned within the tool 54, the connectors 32, optical fibers 46 and flexible boots 52 are routed to the receptacles 28, the tether cable 22 (comprising the plenum) is positioned within opening 42 and a furcation 40 is positioned within the tool 54. Once the components are properly positioned, the second portion of the clamshell tool 54 is secured onto the first portion and the overmolding material is injected or poured into the tool 54 so that the overmolding material surrounds and encapsulates the components. After curing, the overmolding material forms a rugged and sealed (i.e., moisture impervious) terminal housing 24 suitable for use in an outdoor environment. As in the previous embodiments, the overmolding process and tool 54 may further form a smooth transition boot 51 adjacent the cable entry opening 42.

Figure 10:
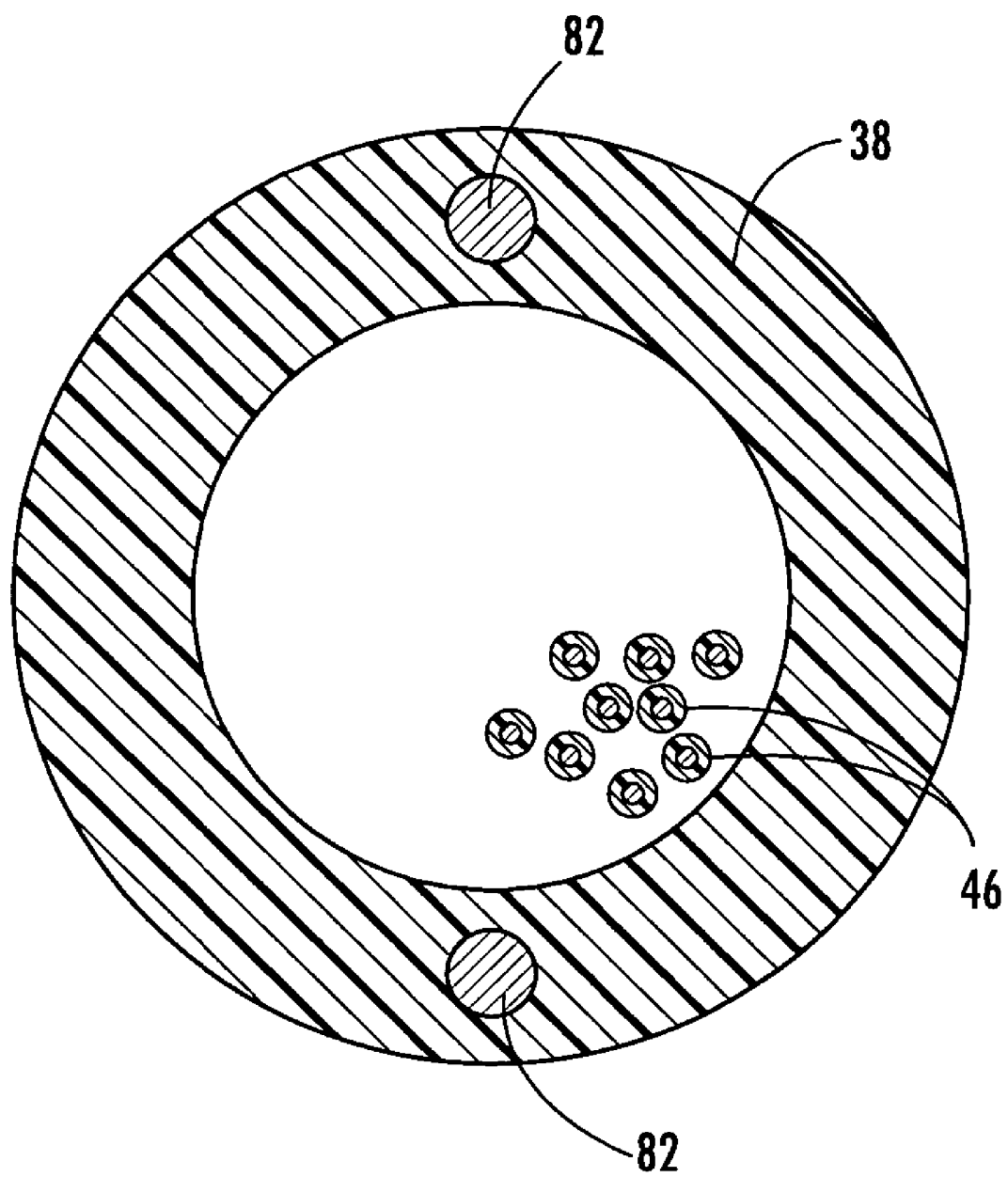
FIG. 10 is a cross sectional view of the tether cable of FIG. 9 taken through line 10-10 illustrating an enlarged inner diameter of the tether cable that defines a distributed plenum for accommodating EFL in the optical connection terminal caused by cable shrinkage or pistoning during connector mating.

Referring to FIG. 10, a cross-sectional view of the distributed plenum defined by oversized inner diameter tether cable 22 is shown taken along line 10-10 of FIG. 9. The tether cable 22 includes a cable jacket or sheath 38, one or more strength members 82 and one or more optical fibers 46. The tether cable 22 includes a relatively large inner diameter for accommodating EFL caused by cable shrinkage and connector mating without incurring micro bending. The air space created by the plenum also allows sufficient fiber movement to accommodate the EFL and to allow the lengths of the optical fibers 46 to be adjusted during assembly of the multi-port terminal 20 within the tool 54. The oversized tubular tether cable 22 is used to provide a tethered multi-port terminal 20 in which free-floating fibers are used in conjunction with a distributed plenum. In an exemplary embodiment, the tether cable 22 has a fill ratio, defined herein as the total cross-sectional area of the optical fibers 46 divided by the cross-sectional area of the inner diameter of the tubular tether cable 22, less than about 80%. In other words, the total cross-sectional area of the optical fibers 46 accounts for no more than about 80% of the available volume within the tubular tether cable 22. More preferably, the fill ratio of the tether cable 22 is less than about 50%, and most preferably, less than about 20%.

Figure 11:
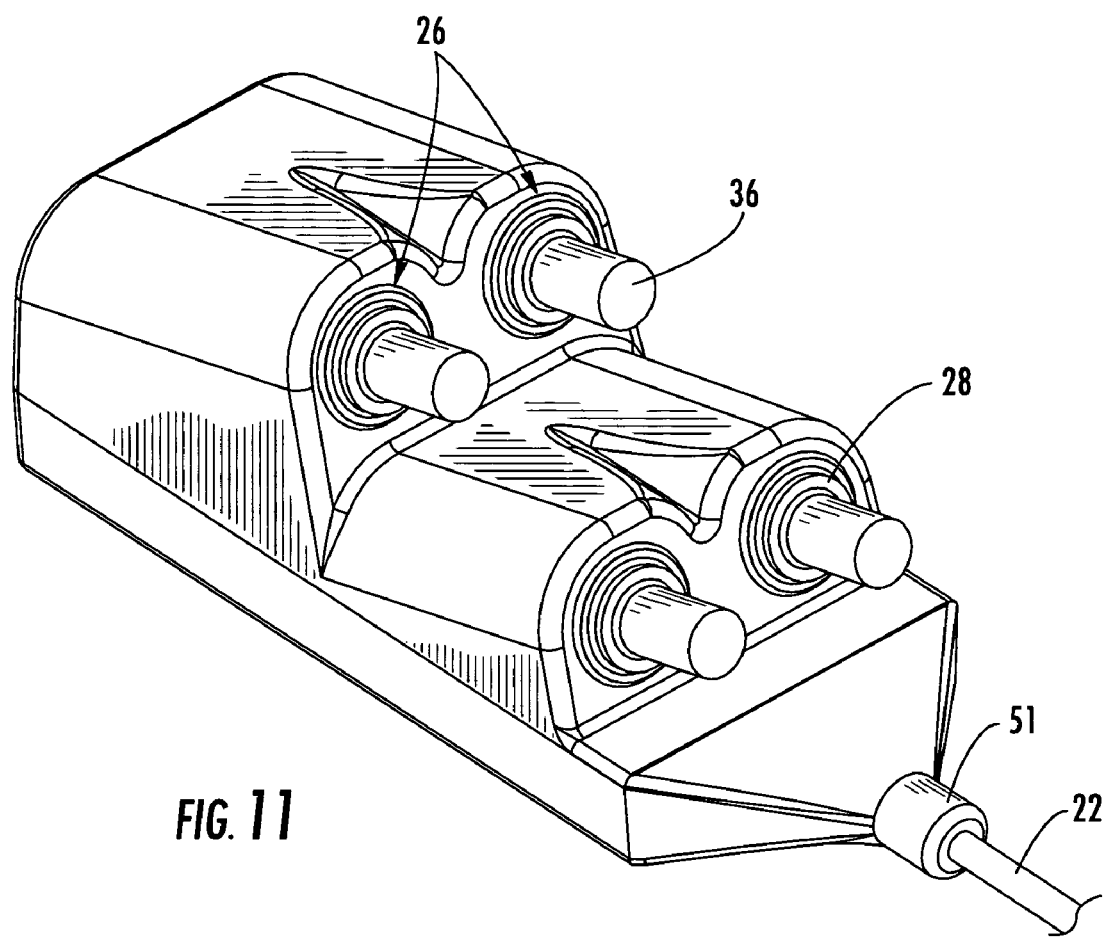
FIG. 11 is a perspective view of an overmolded optical connection terminal including four connector ports arranged in rows and a tether cable in accordance with another exemplary embodiment of the present invention.
Figure 12:
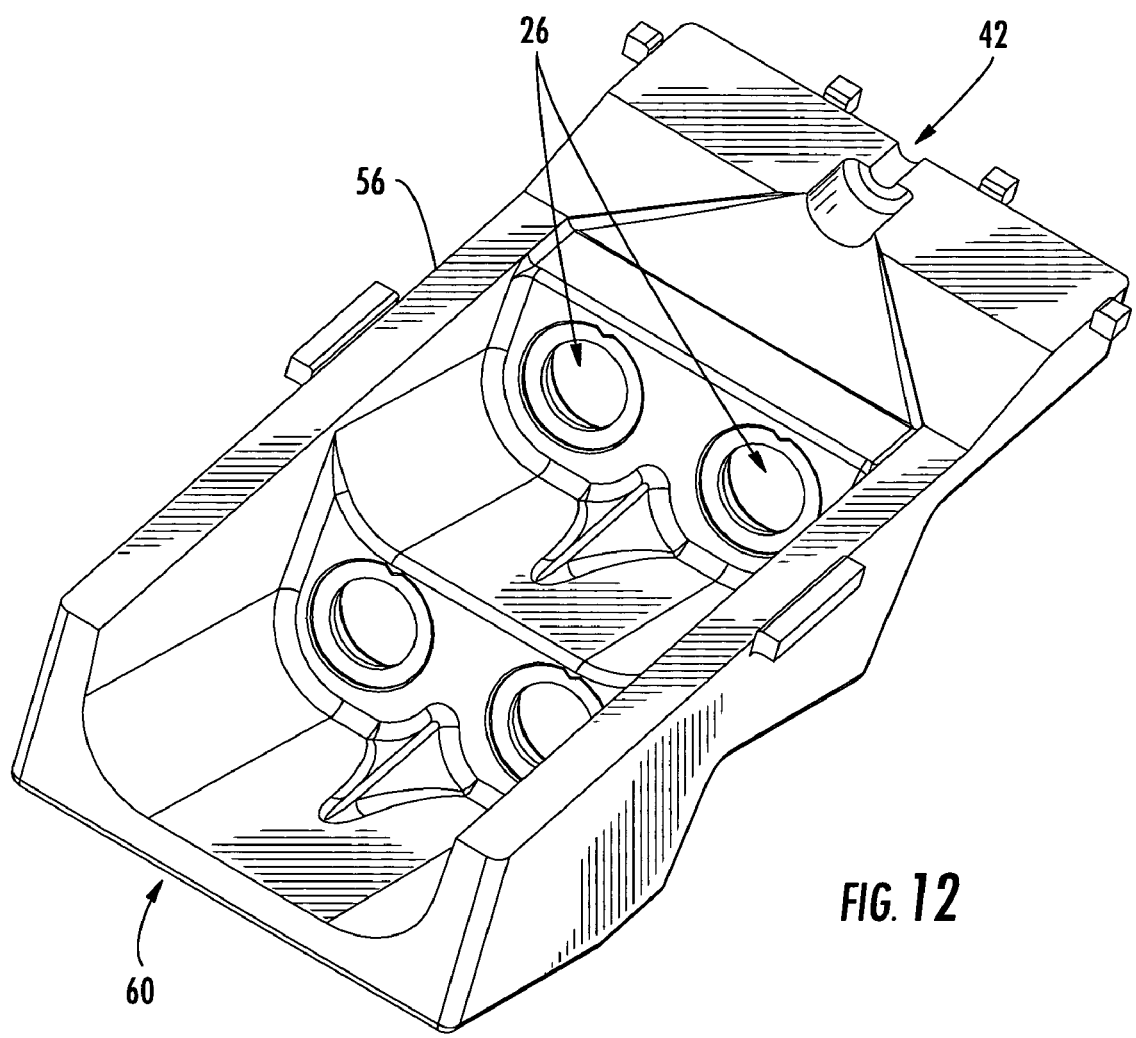
FIG. 12 is a perspective view of a first portion of a molding tool for overmolding the multi-port optical connection terminal of FIG. 11 including a cable entry opening and a plurality of cavities for positioning the connector ports prior to molding.
Figure 13:
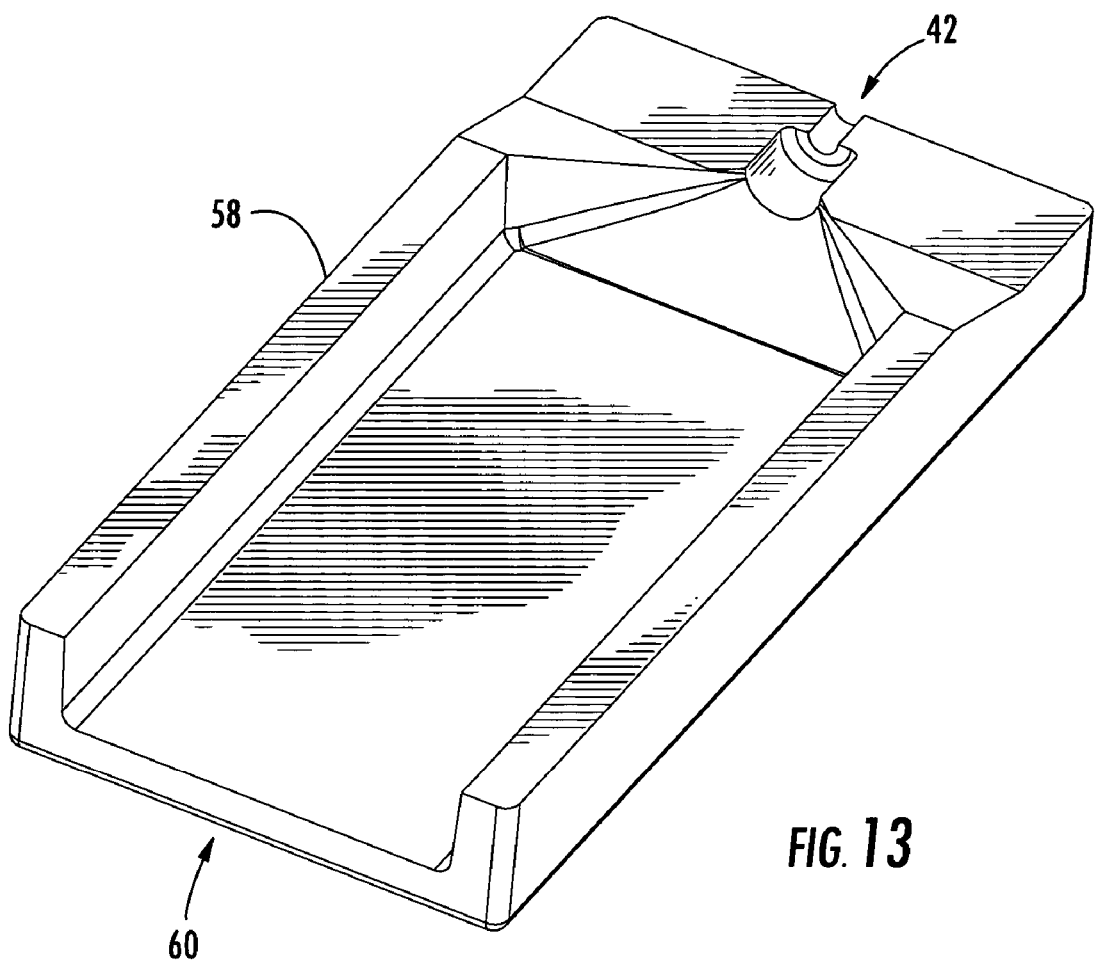
FIG. 13 is a perspective view of a second portion of a molding tool for overmolding the multi-port optical connection terminal of FIG. 11.

Referring to FIG. 11, another embodiment of an overmolded multi-port optical connection terminal 20 in accordance with the present invention is shown. In this embodiment, four connector ports 26 are arranged in 2 rows of 2 connector ports 26 each. Each connector port 26 is occupied with a receptacle 28. Each receptacle is occupied with a protective dust cap 36 that is removed once the connector port 26 is needed and a connectorized drop cable 34 is attached. Referring to FIG. 12, a first portion 56 of an overmolding tool is used to form the top surface of the terminal housing 24 with connector ports 26. As can be seen in FIG. 12, the connector ports 26 recesses formed in tool 56 define openings for receiving to front side of receptacles 28. The receptacles 28, once positioned, fill in the recesses and provide a seal for the overmolding material. A second portion 58 of the overmolding tool is shown in FIG. 13. The two portions 56, 58 of the overmolding tool are secured together to define an internal cavity for receiving the overmolding material. The tether cable 22 is positioned within the cable opening 42. The overmolding material may be poured or injected from the open end 60 of the portions 56, 58. As with all of the previous overmolding tools, the mold defines the exterior shape of the terminal housing 24 and transition boot 51, and secures a portion of the tether cable 22 within the housing 24. A variety of structures may be used to provide a centralized or distributed plenum within the housing 24, as previously described.

Figure 14:
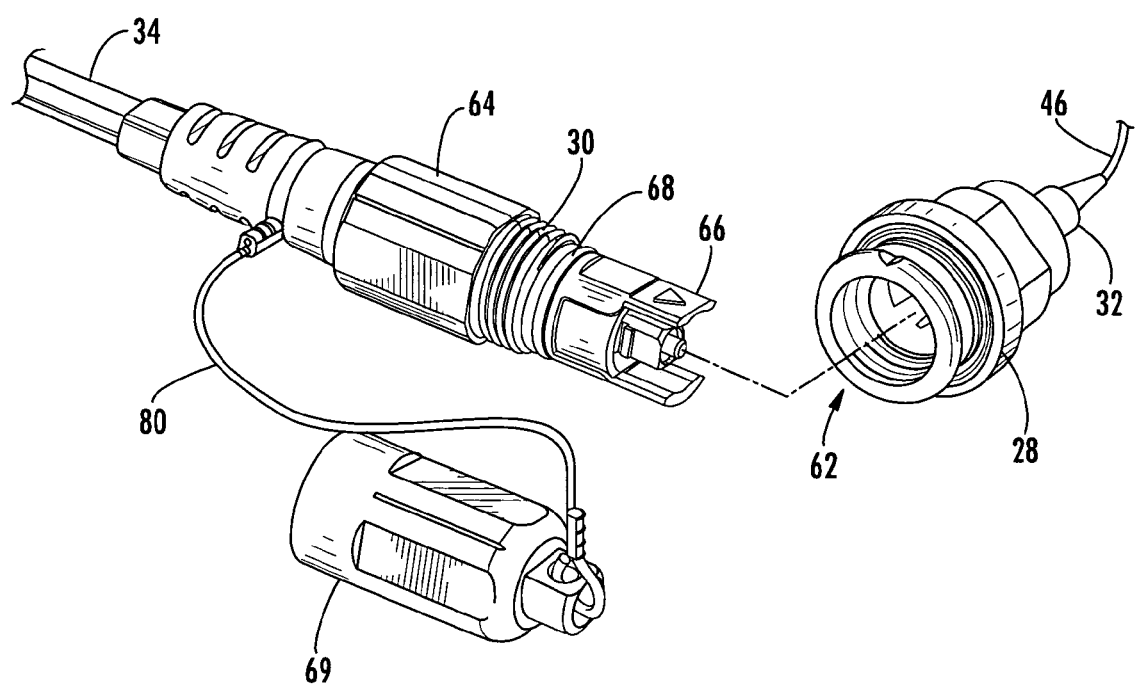
FIG. 14 is a perspective view of a typical connector port comprising a receptacle for positioning within an exterior wall of an overmolded optical connection terminal and an exemplary connectorized drop cable for mating with the receptacle from outside the optical connection terminal.

Referring to FIG. 14, an exemplary receptacle 28 and corresponding plug 30 of a fiber optic drop cable 34 are shown. Throughout all embodiments described herein, the size and shape of the overmolding tools, and in turn the connector ports 26, should be configured to correspond with the type of receptacle 28 utilized. As shown, the receptacle 28 defines a through passageway having open opposed ends, the front side end 62 being internally threaded so as to receive and secure the externally threaded coupling nut 64 of the plug 30. Located medially within the passageway of the receptacle 28 is an adapter or connector alignment sleeve (not shown) for aligning the ferrules of the opposing connectors, and consequently the opposing optical fibers, of the mating plug 30 and connector 32. The mating plug 30 may define a keying feature 66 so that the plug 30 can be inserted into the receptacle 28 in only a predetermined orientation. This capability is especially important when mating opposing APC ferrules, such as SC APC ferrules of the type available from Corning Cable Systems LLC of Hickory, N.C., that must be aligned in an opposite orientation to prevent signal losses. An O-ring 68 may also be provided on the plug 30 to form an environmental seal between the plug 30 and the front side of the receptacle 28 when the external threads of the coupling nut 64 engage the internal threads of the receptacle 28. The plug 30 may be covered with a dust cap 69 when not in use. A lanyard 80 may also be provided so that the dust cap 69 remains attached to the plug 30 after being removed.

The overmolded multi-port optical connection terminals 20 of the present invention including a tether cable 22 may be used in conjunction with a distribution cable comprising one or more mid-span access locations, also referred to as tether attach points. In one embodiment, the first end of the tether cable 22 is attached to a mid-span access location in the factory. In alternative embodiments, the first end of the tether cable 22 is attached to a mid-span access location subsequent to deployment of a distribution cable, wherein the mid-span access may be performed in either the field or the factory. In field installation, the first end of the tether cable 22 may be secured using a conventional enclosure or may be overmolded. As is well known and understood in the art, the optical fibers of the tether cable 22 may be spliced in any conventional manner, such as by fusion or mechanical splicing, either individually or in mass, to one or more optical fibers terminated from the distribution cable. The splice connections may be located either within the tether cable 22 or within an overmolded body between the distribution cable and the tether cable 22. In an alternative embodiment, the optical fibers of the distribution cable may be optically connected to the optical fibers of the tether cable 22 by one or more single fiber or multifiber optical connectors mounted upon the ends of the optical fibers (i.e., a "pigtail").

To prepare a mid-span access location in either the field or the factory, a section of the sheath of the distribution cable is removed to expose the optical fibers within the cable sheath. The optical fibers are typically disposed within individual buffer tubes that are helically wound within the cable sheath in a known manner. The exposed length of the distribution cable and the buffer tubes may vary depending on the length of the optical fibers needed and the manner in which the optical fibers are accessed and terminated. However, in a preferred embodiment, the length ranges between about 3 and about 36 inches. For a given mid-span access location, the buffer tube may be accessed in multiple places using a standard No-Slack Optical Fiber Access Tool (NO-FAT) available from Corning Cable Systems LLC of Hickory, N.C. Buffer tube access cuts are preferably made on the appropriate buffer tube and preselected optical fibers are accessed and severed from the distribution cable. For example, in a buffer tube comprising twelve optical fibers, only four or eight of the optical fibers may be terminated, while the remaining optical fibers remain intact. The optical fibers are transitioned smoothly out of the buffer tube and then spliced, as described above, to the optical fibers of the tether cable 22.

With the first ed of the tether cable 22 attached to the mid-span access location, the tether cable 22 has a preselected or customized length sufficient to ensure that the connector ports 26 are positioned at a desired location in the fiber optic communications network regardless of the actual position of the mid-span access location. The length of tether cable 22 permits the distribution cable assembly to be pre-engineered and factory-assembled without absolute accuracy in the position of the mid-span access location in the fiber optic communications network. The tether cable 22 is typically securely lashed to the distribution cable by straps, clamps or other like fasteners at predetermined intervals along the length of the tether cable 22. The optical connection terminal housing 24 is then positioned at the desired location (i.e., "tap point") in the fiber optic communications network. Depending upon the amount of slack length of the tether cable 22 to be managed, the slack length may be coiled and lashed to the distribution cable, an aerial cable strand or telephone pole, for example, or may be coiled and stored within a pedestal, vault or hand hole in a known manner.

The exemplary embodiments of an overmolded multi-port optical connection terminal 20 including a tether cable 22 shown and described herein provide a number of significant advantages over previously known solutions for mitigating span length measurement differences and providing a tap point at a desired location in a fiber optic communications network. The tether cable 22 permits a mid-span access location that is positioned at an incorrect location in a fiber optic communications network to be re-positioned at the desired tap point location following deployment of the distribution cable. By providing a terminal 20 including a tether cable 22 having a preselected or customized length, the tether cable 22 further provides the ability to extend the fiber optic communications network laterally from the distribution cable, for example across a street in a subdivision. In addition to the advantages described above, a multi-port terminal 20 constructed in accordance with the present invention provides a field technician with the ability to readily connect, disconnect and reconfigure optical connections at a convenient tap point regardless of the actual position of the corresponding mid-span access location in the network, while accommodating for EFL caused by shrinkage of the tether cable 22 and/or pistoning of the optical fibers 46 of the tether cable 22 resulting from connector mating.

The foregoing is a description of various embodiments of the invention that are provided here by way of example only. Although the multi-port optical connection terminal has been described with reference to preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

That which is claimed is:

1. An overmolded optical connection terminal for a fiber optic cable, the terminal comprising:
    a tether cable having a first end adapted to be attached to the fiber optic cable and a second end terminating in one or more optical connectors, the tether cable containing a plurality of optical fibers optically connected to a corresponding plurality of optical fibers terminated from the fiber optic cable;
    an overmolded housing at the second end of the tether cable and defining at least one connector port for providing access to the one or more optical connectors of the tether cable optically connected to the plurality of optical fibers terminated from the fiber optic cable; and
    a plenum defining an air space for accommodating excess fiber length (EFL) of the optical fibers of the tether cable.

2. The terminal of claim 1, wherein the plenum is defined by an internal cavity within the overmolded housing sufficient for accommodating the EFL without micro bending of the optical fibers of the tether cable.

3. The terminal of claim 1, wherein the plenum comprises a base portion, a lid portion, a tether table opening, an internal cavity and a plurality of optical fiber openings.

4. The terminal of claim 1, wherein the plenum is defined by an oversized tubular portion of the tether cable having an inner diameter sufficient for accommodating the EFL without micro bending of the optical fibers of the tether cable.

5. The terminal of claim 4, wherein the oversized tubular portion of the tether cable has a fill ratio less than about 80%.

6. The terminal of claim 4, wherein the oversized tubular portion of the tether cable has a fill ratio less than about 50%.

7. The terminal of claim 4, wherein the oversized tubular portion of the tether cable has a fill ratio less than about 20%.

8. The terminal of claim 1, further comprising a furcation at the second end of the tether cable for separating the optical fibers of the tether cable Into individual optical fibers that are routed to a respective connector port.

9. The terminal of claim, wherein the first end of the tether cable is attached to a fiber optic distribution cable at a mid-span access location of the distribution cable.

10. The terminal of claim 9, wherein the tether cable is attached to the fiber optic distribution cable in the factory, the tether cable is lashed to the distribution cable and the overmolded housing is clamped to the distribution cable during transport and deployment.

11. The terminal of claim 1, wherein the at least one connector port comprises a plurality of connector ports arranged In a linear array.

12. The terminal of claim 1, wherein the at least one connector port comprises a plurality of connector ports arranged in multiple rows each comprising multiple connector ports.

13. The terminal of claim 1, wherein the at least one connector port is a receptacle comprising a connector alignment sleeve for aligning and optically connecting at least one of the optical connectors on the second end of the tether to an opposing optical connector of a connectorized fiber optic drop cable.

14. An overmolded multi-port optical connection terminal adapted to be attached to a fiber optic distribution cable at a mid-span access location to interconnect at least one optical fiber terminated from the distribution cable at the mid-span access location to at least one optical fiber of a connectorized fiber optic drop cable, the terminal comprising:

a tether cable containing a plurality of optical fibers and having a first end and a second end;

an overmolded housing at the second end of the tether cable defining a plurality of connector ports, the connector ports receiving at least one optical connector mounted upon the end of at least one of the plurality of optical fibers of the tether cable for mating with an opposing optical connector mounted upon the end of the at least one optical fiber of the connectorized fiber optic drop cable; and a plenum means for accommodating excess fiber length (EFL) caused by shrinkage of the tether cable and pistoning of the at least one optical fiber of the tether cable when the opposing optical connectors are mated.

15. The multi-pod terminal of claim 14, wherein the plenum means is defined by an internal cavity within the overmolded housing sufficient for accommodating the EFL without micro bending of the optical fibers of the tether cable.

16. The multi-port terminal of claim 14, wherein the plenum means is defined by an oversized tubular portion of the tether cable having an inner diameter sufficient for accommodating the EFL without micro bending of the optical fibers of the tether cable.

17. The multi-port terminal of claim 16, wherein the oversized tubular portion of the tether cable has a fill ratio less than about 80%.

18. The multi-port terminal of claim 16, wherein the oversized tubular portion of the tether cable has a fill ratio less than about 50%.

19. The multi-port terminal of claim 16, wherein the oversized tubular portion of the tether cable has a fill ratio less than about 20%.

20. The multi-port terminal of claim 14, wherein the plurality of connector ports are arranged in multiple rows each comprising multiple connector ports.

* * * * *